US006832018B2

(12) United States Patent
Abushagur

(10) Patent No.: US 6,832,018 B2
(45) Date of Patent: Dec. 14, 2004

(54) DYNAMICALLY RECONFIGURABLE OPTICAL ADD/DROP MULTIPLEXER

(75) Inventor: Mustafa Abushagur, Rochester, NY (US)

(73) Assignee: Mustafa A.G. Abushagur, Rochester, NY (US)

( * ) Notice: Subject to any disclaimer, the term of this patent is extended or adjusted under 35 U.S.C. 154(b) by 110 days.

(21) Appl. No.: 10/136,223

(22) Filed: Apr. 30, 2002

(65) Prior Publication Data

US 2003/0202741 A1 Oct. 30, 2003

(51) Int. Cl.[7] .................................................. G02B 6/28
(52) U.S. Cl. ............................. 385/24; 385/27; 385/28
(58) Field of Search ............................. 385/24, 27, 37, 385/43, 124, 127, 130; 359/124, 127, 130

(56) References Cited

U.S. PATENT DOCUMENTS 5,822,095 A * 10/1998 Taga et al. ..................... 398/85
6,289,148 B1 * 9/2001 Lin et al. ....................... 385/24
6,445,841 B1 * 9/2002 Gloeckner et al. ............. 385/17
6,449,407 B1 * 9/2002 Kiang et al. ................... 385/18

* cited by examiner

Primary Examiner—Karl D. Frech

(57) ABSTRACT

A dynamically reconfigurable optical add/drop multiplexer makes use of a single or a plurality of optical narrowband filters and a single or plurality of actuated optical devices to re-map the optical beams through the filter/s to drop and/or add a light of one wavelength. The input optical beam may be composed of a plurality of wavelengths. The beam as it impinges on the narrowband filter is reflected except for a single wavelength that passes through. The reflected beam can either be directed to couple the light to output ports or reflected to impinge on another filter to pass another wavelength and reflect the rest of the wavelengths. This can be repeated to drop a plurality of wavelengths individually. Adding a wavelength to the beam may be introduced at the filter where that specific wavelength is dropped to pass through the filter and join the reflected beam. This also is repeated for adding a plurality of wavelengths. This invention can be used to drop/add bands of wavelengths.

17 Claims, 4 Drawing Sheets

US 6,832,018 B2

DYNAMICALLY RECONFIGURABLE OPTICAL ADD/DROP MULTIPLEXER

BACKGROUND

1. Field of the Invention

This invention relates to the field of optical components and communication systems and, more particularly, to the filtering of optical signals and wavelength division multiplexing and demuliplexing.

2. Background of the Invention

Today's high speed telecommunication networks employ optical fibers as the medium for transmission. These networks can extend to thousands of kilometers and can have hundreds of nodes. The capacity of optical networks has been increased by transmitting channels using wavelength division multiplexing (WDM). To increase the flexibility of theses networks there is a need of making the WDM dynamic.

SUMMARY OF THE INVENTION

In accordance with the current invention, a dynamically reconfigurable optical add/drop multiplexer is used to add/drop a single or plurality of wavelengths from a set of predetermined wavelengths. The optical beam delivered through an optical fiber, a waveguide or other means impinges on a narrowband optical filter. The filter is designed to pass the light of a particular wavelength and reflects the light of other wavelengths. At any filter a wavelength is dropped and the same wavelength can be added back. To drop a plurality of wavelengths the beam is passed through a plurality of filters. The said filtering device is made out of a set of filters each passes a particular wavelength. There are two implementations of the said invention.

The first embodiment of the invention is for dropping, and possibly adding, a single wavelength from a predetermined set of wavelengths. This can be done by moving the filtering device across the optical beam and placing the desired filter in its path or by redirecting the optical beam through a set of mirrors to align it and pass it through the proper filter.

The second embodiment of the invention is for dropping, and possibly adding, a single wavelength from a predetermined set of wavelengths. This can be done by using a stationary narrow band optical filter array device and actuated mirrors that route the optical beam.

The third embodiment of the invention is for dropping, and possibly adding, a plurality of wavelengths. This can be achieved by routing the beam through a set of actuated mirrors through the desired filters.

DETAILED DESCRIPTION OF THE PREFERRED EMBODIMENTS

Figure 1:
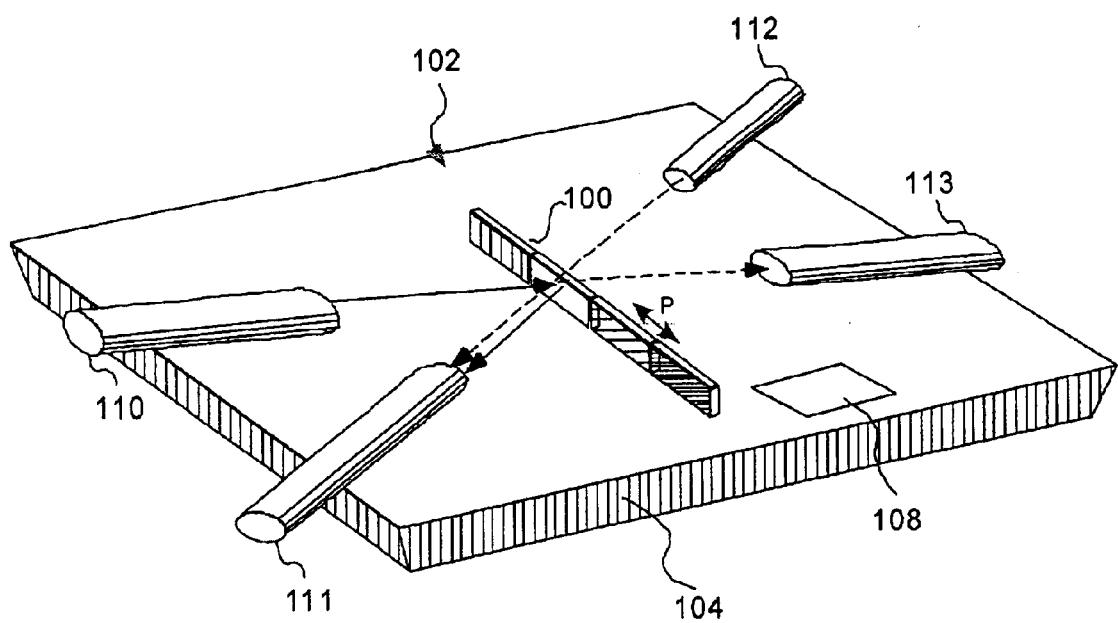
FIG. 1 is an embodiment of the dynamically reconfigurable optical add/drop multiplexer invention with a movable filtering device for dropping and/or adding a single wavelength.
Figure 2:
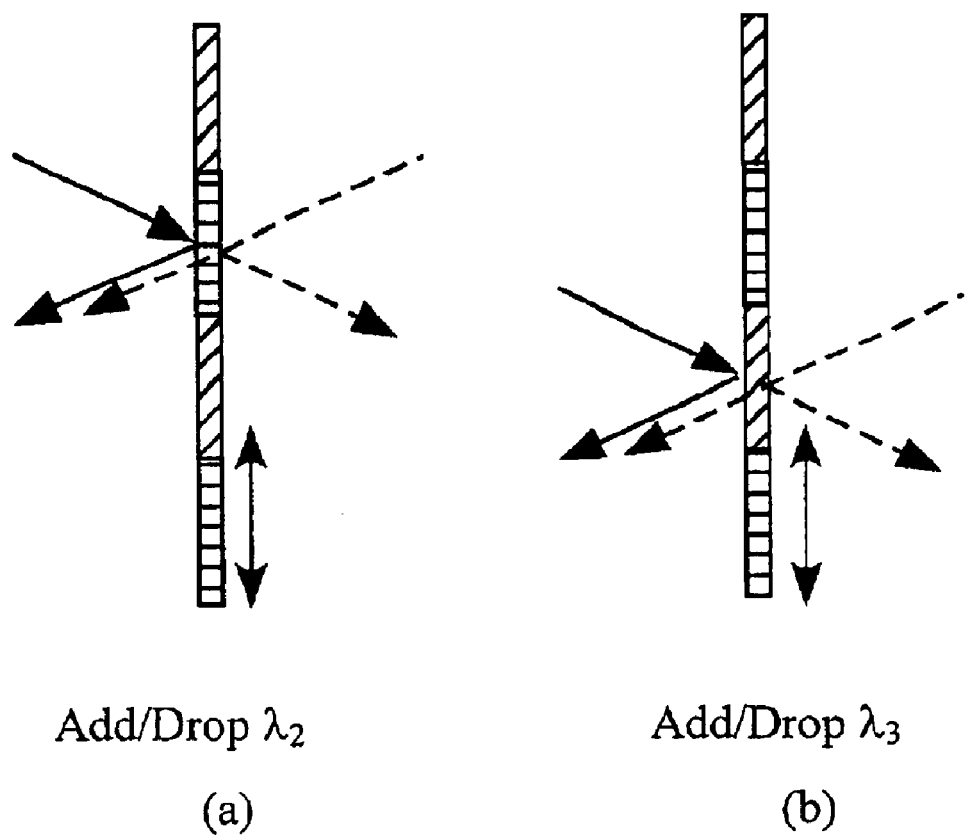
FIG. 2 positioning of the filter array for adding and dropping two different wavelengths using the first embodiment of the invention.

The first embodiment of the current invention for dynamically dropping and adding a single wavelength from a set of predetermined wavelengths is shown in FIG. 1. The dynamic optical add/drop multiplexer (DOADM), 102, comprises: input 110 and 112 and output fibers 111 and 113, a filter-array 100. The input signal light beam propagates along fiber 110. This input light beam contains a plurality of wavelengths say $\lambda_1, \lambda_2, \ldots, \lambda_N$. The light impinges on a filter-array 100. The said filter-array contains a plurality of narrow-band optical filters Each filter is designed to pass a single wavelength, with a certain linewidth, and reflects all other wavelengths. The said filter array, 100, is affixed to an actuator that is capable of moving the filter along directions P. As the input beam impinges on a filter it passes a specific wavelength. This is called "dropping" of a wavelength. To drop another wavelength the filter-array 100 is moved along direction P to place another filter on the path of the optical beam, as shown in FIG. 2. The beam that passes through the filter is coupled into fiber 113. The dropped wavelength propagates along fiber 113. The reflected beam that contains the rest of the wavelengths is coupled into fiber 111. Adding back a wavelength is achieved through propagating that beam through fiber 112 and the beam will pass through the filter and combine with the reflected beam and couples into fiber 111. This device allows for dropping a wavelength and adding the same wavelength back. The light beam emanating from any of the fibers is passed through a lens, e.g. a graded index rod lens, to be collimated. The collimated beams coupled into the fibers pass through lenses to focus the beam on the core of the fiber and match it with the numerical aperture of the fiber. The OADM may be constructed on a platform 104. The actuator is controlled through drive electronics 108. This whole system may be fabricated using microelectromechanical system (MEMS) fabrication methods. The DOADM is shown in FIG. 2 for dropping and adding two specific wavelengths. FIG. 2(a) shows the dropping and adding wavelength, $\lambda_2$. By moving the filter array 100 one step upward, wavelength $\lambda_3$ is now being dropped and added as shown in FIG. 2(b).

Figure 3:
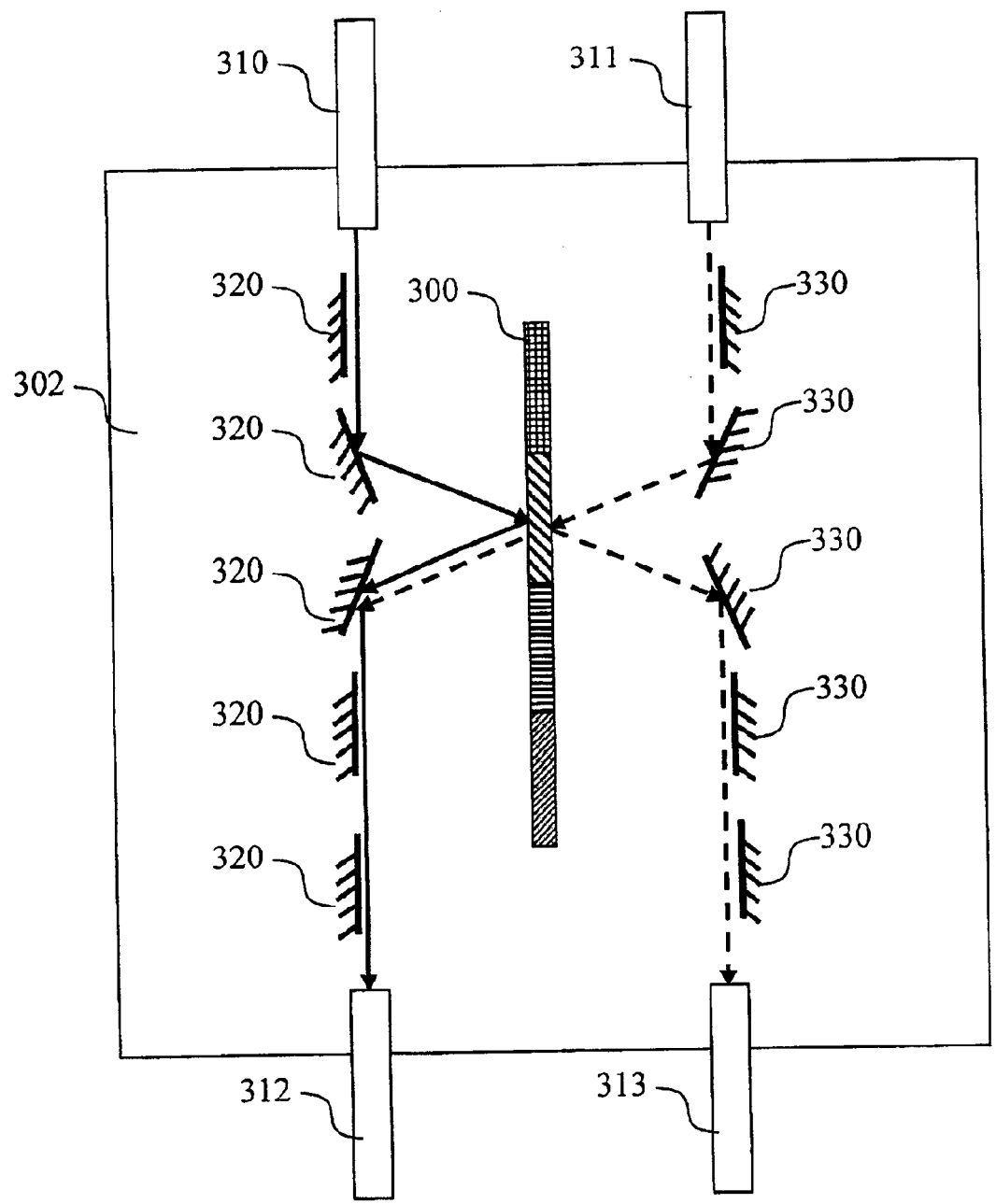
FIG. 3 is a second embodiment of the invention with actuated mirrors for dropping and/or adding a single wavelength.

The second embodiment of the current invention for dynamically dropping and adding a single wavelength from a set of predetermined wavelengths is shown in FIG. 3. The dynamic optical add/drop multiplexer (DOADM) comprises: input fibers, 310 and 311 and output fibers 312 and 313, a filter-array 300 and actuated mirrors 320 and 330. The input signal light beam propagates along fiber 310. Input and output fibers, mirrors and filter array are all affixed to substrate 302. This input light beam contains a plurality of wavelengths say $\lambda_1, \lambda_2, \lambda_3, \lambda_4$. The light impinges on a filter-array 100. The said filter-array contains a plurality of narrow-band optical filters Each filter is designed to pass a single wavelength, with a certain linewidth, and reflects all other wavelengths. As the input beam impinges on a filter it passes the specific wavelengths. This is called "dropping" of a wavelength. The actuated mirrors 320 and 330 are used to redirect the optical beam. The said mirrors may take three positions: (a) stay off the path of the beam, (b) reflect the beam to impinge on the filter, or (c) reflect the beam to couple the beam into the output fiber. To drop a wavelength, the proper mirrors are positioned to reflect the beam towards the filter with desired wavelength to be dropped, as shown in the exemplary drawings of FIG. 3. Adding back a wavelength is achieved through propagating the beam through fiber 311 and the beam will pass through the filter to combine with the reflected beam. This is achieved by positioning the actuated mirrors, 330, to direct the beam to the proper filter, as shown in FIG. 3. The dropped wavelength is coupled to the output fiber 313 by positioning the actuated mirrors 330 to do the proper rerouting. This device allows for dropping a wavelength and adding a wavelength which may, or may not, be the same as the one dropped. To add/drop another wavelength the actuated mirrors 320 and 330 are adjusted to route the beams through the proper filter. This embodiment can be applied to a large number of wavelengths.

Figure 4:
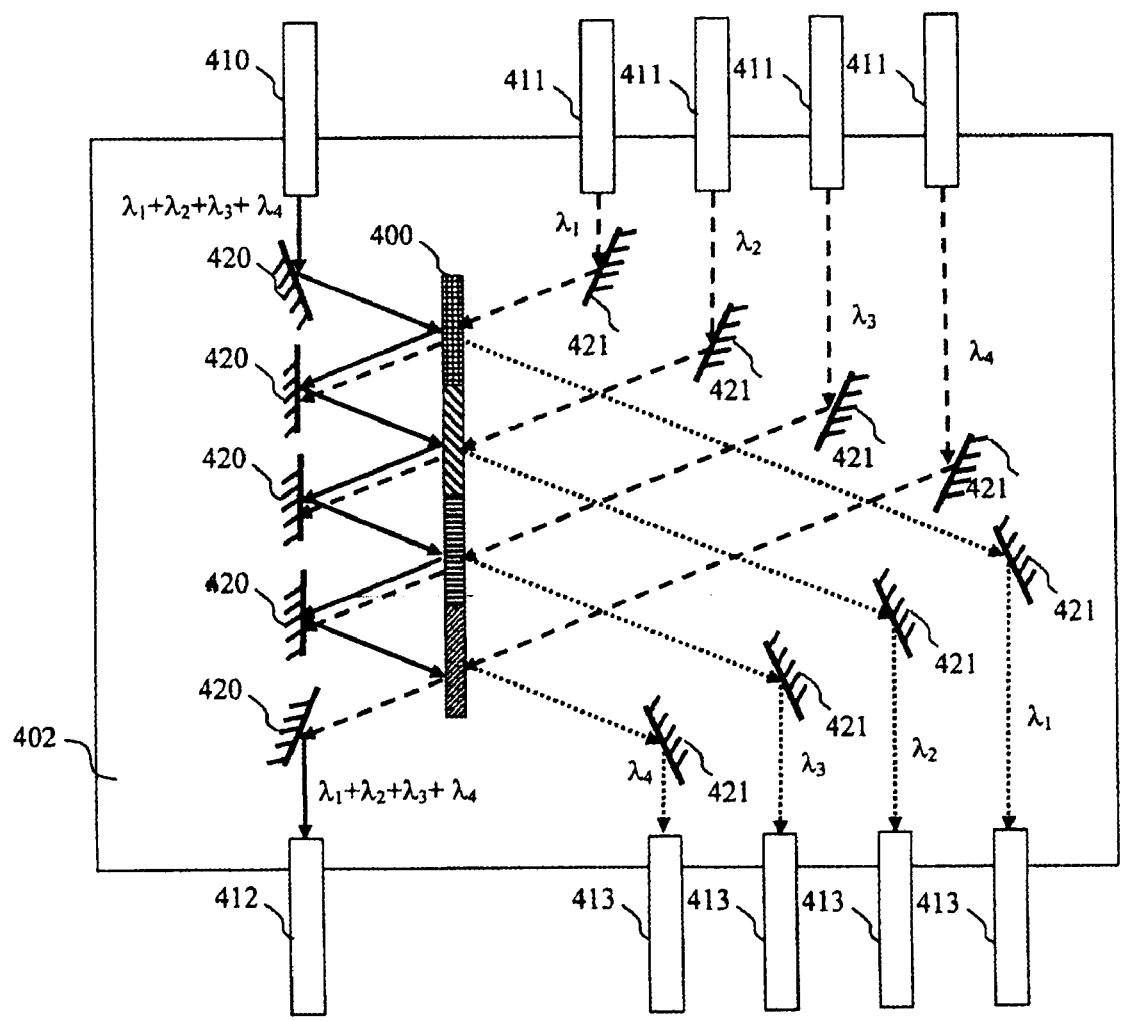
FIG. 4 is a third embodiment of the invention with movable mirrors for dropping and/or adding a plurality of wavelengths.

Shown in FIG. 4 is a third embodiment of the current invention in which a plurality of wavelengths dropped and/or added in an orderly access manner. In FIG. 4 we show an example application where we are dropping all 4 wavelengths. The DOADM comprises input, 410 and 411, and output, 412 and 413, fibers, a filter-array, 400, actuated mirrors, 420 and fixed mirrors, 421. The said actuated mirrors may take three positions: (a) stay off the path of the beam, (b) reflect the beam to impinge on the filter, or (c) reflect the beam to couple the beam into the output fiber. In this embodiment of the invention the input beam propagating along fiber 410 has a plurality of wavelengths, say four wavelengths $\lambda_1+\lambda_2+\lambda_3+\lambda_4$. To drop and add all the wavelengths the actuated mirrors are position as shown in FIG. 4. The wavelengths to be added are introduced through the input fibers 411. The dropped wavelengths are coupled into the output fibers 613. The add wavelength and remaining ones on the input beam are coupled into output fiber 612. This device allows the add/drop of any number of wavelengths. This facilitated through the positioning of the actuated mirrors 620. Embodiments for dropping larger number of wavelengths are obvious extension of this.

What is claimed is:

1. A dynamically reconfigurable optical add/drop multiplexer for multiple wavelength optical signals comprising:
    a) abase;
    b) an input carrier elements;
    c) a plurality of input ports;
    d) a set of discrete optical band-pass filters in the form of a one dimensional array, the pass wavelength of the filter depends on the position of the filter array with respect to optical axis of the input beam;
    e) an actuator to slide the filter-array to place it in predetermined positions;
    f) an output carrier elements; and
    g) a plurality of output ports.

2. A dynamic optical add/drop multiplexer according to claim 1 wherein each filter of the filter-array passes one wavelength and reflects others.

3. A dynamic optical add/drop multiplexer according to claim 1 wherein the filter is made using multilayer optical thin films.

4. A dynamic optical add/drop multiplexer according to claim 1 wherein the filter is made using diffractive optical elements.

5. A dynamic optical add/drop multiplexer according to claim 1 wherein optical fiber is coupled to each optical port.

6. A dynamic optical add/drop multiplexer according to claim 1 wherein the filter-array is positioned by the actuator to allow a particular filter to be in the path of the input optical beam.

7. A dynamic optical add/drop multiplexer according to claim 1 wherein the dropped wavelength is coupled into the proper optical port.

8. A dynamic optical add/drop multiplexer according to claim 1 wherein the added wavelength passes through the filter and propagates along with the reflected beam and coupled into the output port.

9. A dynamically reconfigurable optical add/drop multiplexer comprising:
    a) abase;
    b) an input carrier elements;
    c) a plurality of input ports;
    d) a set of band-pass filters in the form of a one dimensional array, the pass wavelength of the filter depends on the position of the filter array with respect to optical axis of the input beam;
    e) a set of actuated mirrors; and
    f) a plurality of output ports.

10. A dynamic optical add/drop multiplexer according to claim 9 wherein each filter of the filter-array passes one wavelength and reflects others.

11. A dynamic optical add/drop multiplexer according to claim 9 wherein an optical fiber is coupled to each optical port.

12. A dynamic optical add/drop multiplexer according to claim 9 wherein the filter is made using multilayer of optical thin films.

13. A dynamic optical add/drop multiplexer according to claim 9 wherein the filter is made using diffractive optical elements.

14. A dynamic optical add/drop multiplexer according to claim 9 wherein each filter of the filter-array reflects one wavelength and passes others.

15. A dynamic optical add/drop multiplexer according to claim 9 wherein the said actuated mirrors are used to direct the optical beams to pass through proper filters.

16. A dynamic optical add/drop multiplexer according to claim 9 wherein the actuated mirrors are used to direct the optical beams to the optical ports.

17. A dynamic optical add/drop multiplexer according to claim 9 wherein the actuated mirrors can be positioned to drop and/or add a plurality of wavelengths.

* * * * *